(12) United States Patent
Shin

(10) Patent No.: US 9,335,946 B2
(45) Date of Patent: May 10, 2016

(54) METHOD AND APPARATUS FOR MANAGING MEMORY

(71) Applicant: Samsung Electronics Co., Ltd, Gyeonggi-do (KR)

(72) Inventor: Hee-Sub Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 14/070,338

(22) Filed: Nov. 1, 2013

(65) Prior Publication Data
US 2014/0189272 A1 Jul. 3, 2014

(30) Foreign Application Priority Data

Dec. 31, 2012 (KR) .................. 10-2012-0158288

(51) Int. Cl.
| G06F 12/00 | (2006.01) |
| G06F 3/06 | (2006.01) |
| G06F 12/02 | (2006.01) |
| G06F 9/00 | (2006.01) |

(52) U.S. Cl.
CPC ............ *G06F 3/0647* (2013.01); *G06F 3/0619* (2013.01); *G06F 3/0673* (2013.01); *G06F 12/0223* (2013.01); *G06F 12/0284* (2013.01)

(58) Field of Classification Search
CPC ............ G06F 12/00; G06F 9/00; G06F 13/00
USPC ............................ 711/147, 170; 710/8–10, 36
See application file for complete search history.

(56) References Cited

U.S. PATENT DOCUMENTS

| 6,370,633 | B2 | 4/2002 | Sethi | |
| 7,039,907 | B2 * | 5/2006 | May ....................... | G06F 8/445 717/151 |
| 7,428,616 | B2 * | 9/2008 | Ogawa ................ | G06F 12/0888 711/118 |
| 7,453,712 | B2 * | 11/2008 | Kim .................... | G11C 11/5621 365/200 |
| 7,484,070 | B1 | 1/2009 | Walton et al. | |

(Continued)

FOREIGN PATENT DOCUMENTS

| JP | 2003-131938 | 5/2003 |
| KR | 10-2003-0071299 A | 9/2003 |

(Continued)

OTHER PUBLICATIONS

Written Opinion of the International Searching Authority dated Mar. 7, 2014 in connection with International Patent Application No. PCT/KR2013/012001, 6 pages.

(Continued)

*Primary Examiner* — Christopher Shin

(57) ABSTRACT

A method includes, if functional units assigned with multiple reserved areas is not driven, storing data with one of a data withdrawal condition set in the multiple reserved areas, and if the functional unit is driven, processing data stored in the one of the multiple reserved areas to restore the multiple reserved areas for driving the functional units based on the one of the data withdrawal condition set. An apparatus comprises a memory including multiple reserved areas and multiple non-reserved areas, wherein if a functional unit assigned with one of the multiple reserved areas is not driven, data is stored in the one of the multiple reserved areas with one of a data withdrawal condition set, and when the functional units is driven, data stored in the one of the multiple reserved areas is processed to restore the one of the multiple reserved areas.

29 Claims, 7 Drawing Sheets

(56) References Cited

U.S. PATENT DOCUMENTS

| | | | |
|---|---|---|---|
| 8,218,414 B2* | 7/2012 | Takahashi | G11B 7/00736 369/94 |
| 8,307,185 B2* | 11/2012 | Maki | G06F 9/5016 711/100 |
| 2001/0039652 A1* | 11/2001 | May | G06F 8/445 717/144 |
| 2004/0044886 A1* | 3/2004 | Ng | G06F 11/1417 713/1 |
| 2005/0155022 A1* | 7/2005 | DeWitt | G06F 11/3612 717/131 |
| 2005/0155026 A1* | 7/2005 | DeWitt, Jr. | G06F 8/443 717/158 |
| 2006/0069825 A1* | 3/2006 | Hodder | G06F 8/61 710/72 |
| 2006/0224819 A1* | 10/2006 | Ito | G06F 12/0246 711/103 |
| 2008/0040572 A1 | 2/2008 | Hsu et al. | |
| 2008/0082780 A1 | 4/2008 | Tsuji | |
| 2008/0126678 A1* | 5/2008 | Mizushima | G06F 11/1068 711/103 |
| 2008/0295097 A1 | 11/2008 | Kocev | |
| 2009/0144349 A1 | 6/2009 | Phillips et al. | |
| 2009/0187911 A1 | 7/2009 | Martinez | |
| 2009/0276564 A1* | 11/2009 | Wong | G06F 12/0246 711/109 |
| 2010/0299672 A1* | 11/2010 | Tagawa | G06F 12/0223 718/104 |
| 2011/0302468 A1* | 12/2011 | Lee | G11C 11/5628 714/718 |
| 2014/0189272 A1* | 7/2014 | Shin | G06F 9/50 711/162 |

FOREIGN PATENT DOCUMENTS

| | | |
|---|---|---|
| KR | 10-2008-0016058 A | 2/2008 |
| KR | 10-2009-0033975 A | 4/2009 |

OTHER PUBLICATIONS

International Search Report dated Mar. 7, 2014 in connection with International Patent Application No. PCT/KR2013/012001, 4 pages.
Extended European Search Report dated Apr. 17, 2014 in connection with European Patent Application No. 13199422.0, 6 pages.

* cited by examiner

METHOD AND APPARATUS FOR MANAGING MEMORY

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Dec. 31, 2012 and assigned Serial No. 10-2012-0158288, the entire disclosure of which is incorporated herein by reference.

TECHNICAL FIELD

The present disclosure relates generally to a method and apparatus for managing a memory in a terminal, and more particularly, to a memory management method and apparatus capable of quickly restoring areas of a memory in a terminal.

BACKGROUND

Some functional units in a system can require allocation of a physically contiguous memory buffer. For example, some hardware requires a physically contiguous memory buffer at all times, for Direct Memory Access (DMA). Although there is even a functional unit equipped with hardware for processing a scatter/gather DMA function, hardware equipped with a low-cost DMA engine can very commonly require a physically contiguous memory.

Such hardware can include a camera, a video encoder/decoder (codec), and the like. In particular, the latest full High-Definition (HD) video frame has a resolution of about 2 Mega pixels or more, and a memory of about 6 Mega Byte (MB) is required to process the full HD video frame. These hardware modules are equipped with a simple DMA engine due to the high manufacturing cost, so they necessarily require a physically contiguous memory for their operation.

However, allocation of a physically contiguous memory may not be guaranteed at all times due to the nature of management of the memory used by an Operating System (OS). The OS divides a physical address space into small units of page frames, for management. This method has no problem in providing a logically contiguous memory space to the processes driven or enabled by the OS. However, in a system of a terminal which has been operating for a very long time, it is almost impossible to find a physically contiguous memory space of a predetermined size or more. In other words, driving of the functional unit may not be guaranteed depending on the fragmentation of a physical memory.

These problems can be fatal to electronic devices such as terminals, meaning that some features of a terminal may not be driven depending on whether the memory allocation is successful. These uncertainties are serious problems, because it must be guaranteed that the features of electronic devices can be driven at all times whenever the users want.

In addition, some functional units require allocation of a specific memory location, or for the functional units, areas of the memory can need to be arranged in a predetermined rule. Therefore, for the reduction of the manufacturing cost or the convenience of the development, hardware designers often reflect these limitations in the design. However, these limitations make the allocation of a physically contiguous memory more difficult.

In order to solve these and other problems, the conventional functional unit driver uses a way to separately reserve its required memory area at the initial driving of the OS. At the initial driving of the OS, a physically contiguous memory can be easily obtained, making it possible for a functional unit to reserve a memory area required for its operation, preventing the OS from using the reserved area. This method guarantees that the allocation of a physically contiguous memory is successful at all times, at the time a functional unit is driven. Therefore, the OS can use only the areas except for the memory area reserved by the functional unit driver, and the reserved area of the memory can be used only for the functional unit.

FIG. 1 illustrates an example physical memory including reserved areas and non-reserved areas. The memory in FIG. 1 has an area 101a reserved for a video codec unit, an area 101b reserved for a camera unit, and a non-reserved area 102 that the OS can dynamically allocate except the reserved areas 101a and 101b.

Undesirably, however, the memory reservation method can cause a waste of the memory since the OS cannot use the reserved areas even when their associated functional units are not being driven. For example, if a ratio of the time during which the camera unit is activated to the total usage time of the device is 10% or less, the area reserved for the camera unit cannot be utilized at all for the remaining time of 90% or more during which the camera unit is not used, causing the waste of the memory.

In recent years, an embedded system uses a System on Chip (SoC) that is manufactured by integrating multiple functional units into one Central Processing Unit (CPU) chip as a single package. With the increasing types and number of functional units embedded in the SoC, such as a video codec, the amount of memory wasted due to the memory areas reserved for these embedded hardware functional units increases more and more, leading to a decrease in available memory that the OS can use. To compensate for these shortcomings, the product can be equipped with a high-capacity memory, leading to a rise in the cost.

In order to solve these issues, the present disclosure presents an approach, in which when a functional unit having a reserved memory area is not driven, the reserved area can be used as a non-reserved area, i.e., an available memory area that the OS can utilize.

If a functional unit assigned with a reserved memory area is driven while using the reserved area as a non-reserved area when the functional unit is not driven, the OS discards the data stored in the reserved area, thereby providing or returning the reserved area to the functional unit as its original purpose.

Discarding the data stored in the reserved area is commonly referred to as 'paging migration'.

Advantageously, this memory management technique can utilize the area reserved for a functional unit that is in an idle state almost at all times, as a general purpose, thereby preventing the waste of memory and increasing the utilization of the memory resources, thus contributing to the improvement of the overall system performance due to the increase in available memory area.

Undesirably, however, the driving time of the functional unit can increase due to the burden of the page migration.

For example, if a memory area reserved for a camera unit is used as a general purpose, driving or execution of a camera application may be delayed than before. The recent camera unit consumes a memory of about tens of megabytes. Performing page migration on a memory space of tens of megabytes may cause a significant delay of the camera driving time.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is primary object to provide a memory management method and apparatus capable of quickly withdrawing areas of a memory in a terminal.

Another aspect of the present disclosure is to provide a memory management method and apparatus capable of quickly withdrawing a reserved area for a device at the time that the device is driven or enabled, to use the reserved area as its original purpose, in a terminal.

In accordance with a aspect of the present disclosure, there is provided a method for managing a memory in a terminal. The method includes, if a functional unit assigned with multiple reserved areas is not driven, storing data with one of a data withdrawal condition set in the multiple reserved areas, and if the functional unit is driven, processing data stored in one of the multiple reserved areas to restore the multiple reserved areas for driving the functional units based on the one of the data withdrawal condition which set.

In accordance with another aspect of the present disclosure, there is provided a method for managing a memory in a terminal. The method includes, if a functional unit assigned with one of multiple reserved areas is not driven, storing data in one of the reserved areas in decreasing order of driving frequencies of corresponding functional units, and if the functional unit is driven, processing data stored in the one of the multiple reserved areas to restore the multiple reserved areas for driving the functional units.

In accordance with further another aspect of the present disclosure, there is provided an apparatus for managing a memory in a terminal. The apparatus includes a video codec that is driven for video recording or video playback, and for which a memory has a reserved area for the video codec; a camera unit that is driven to perform a preview function for image capturing or video recording, and for which the memory has a reserved area for the camera unit; and the memory that includes multiple reserved areas and multiple non-reserved areas, wherein if functional units corresponding to the multiple reserved areas are not driven, data corresponding to a data withdrawal condition which is set for each of the multiple reserved areas is stored in the multiple reserved areas, and if the functional units are driven, data stored in each of the multiple reserved areas is processed depending on the data withdrawal condition which is set for each of the multiple reserved areas, to restore the multiple reserved areas for driving the functional units.

In accordance with yet another aspect of the present disclosure there is provided an apparatus for managing a memory in a terminal. The apparatus includes a video codec that is driven for video recording or video playback, and for which a memory has a reserved area for the video codec; a camera unit that is driven to perform a preview function for image capturing or video recording, and for which the memory has a reserved area for the camera unit; and the memory that includes multiple reserved areas and multiple non-reserved areas, wherein if functional units corresponding to the multiple reserved areas are not driven, data is stored in the reserved areas in decreasing order of driving frequencies of the corresponding functional units; and if the functional units are driven, data stored in each of the multiple reserved areas is processed to restore the multiple reserved areas for driving the functional units.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 2 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminal to which embodiments of the present disclosure are applicable can include a mobile terminal and a fixed terminal. The mobile terminal, an easy-to-carry mobile electronic device, can include a video phone, a cellular phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-book reader, a portable computer (for example, a laptop computer, a tablet computer and the like), a digital camera or the like. The fixed terminal can include a desktop Personal Computer (PC) and the like.

Figure 1:
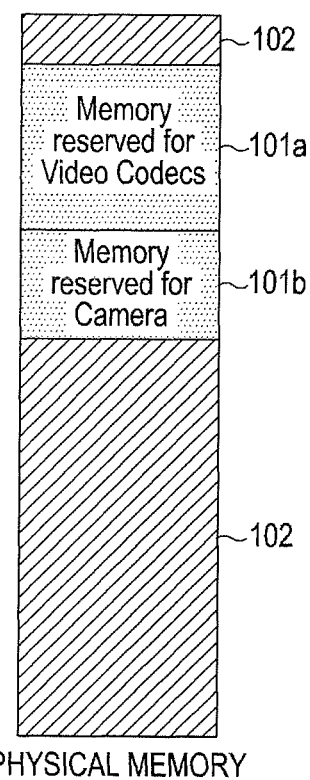
FIG. 1 illustrates a physical memory including reserved areas and non-reserved areas.
Figure 2:
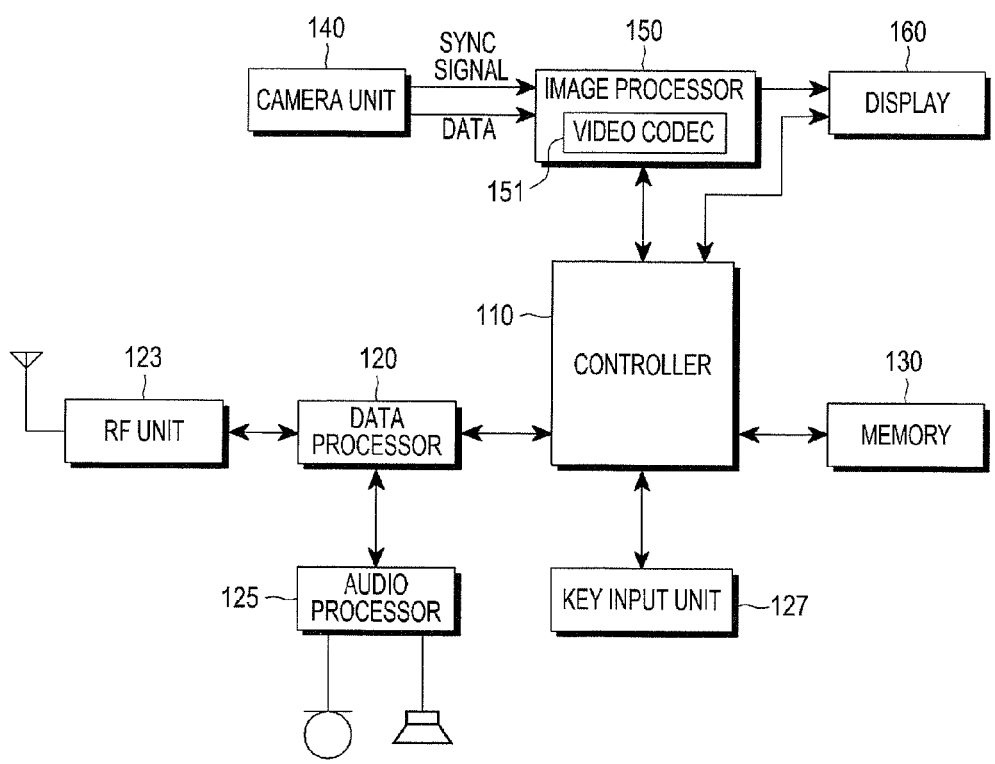
FIG. 2 illustrates a structure of a terminal according to one embodiment of the present disclosure.

FIG. 2 illustrates a structure of a terminal according to one embodiment of the present disclosure. Referring to FIG. 2, a Radio Frequency (RF) unit 123 is responsible for wireless communication of the terminal. The RF unit 123 includes an RF transmitter for up-converting a frequency of transmission signals and amplifying the up-converted signals, and an RF receiver for low-noise-amplifying (LNA) received signals and down-converting a frequency of the LNA-amplified signals. A data processor 120 includes a transmitter for coding and modulating the transmission signals and a receiver for demodulating and decoding the received signals. In other words, the data processor 120 can be comprised of a modulator/demodulator (modem) and a coder/decoder (codec). The codec includes a data codec for processing packet data and the like, and an audio codec for processing audio signals such as voice. An audio processor 125 plays received audio signals output from the audio codec in the data processor 120, using a speaker SPK, and transfers audio transmission signals picked up by a microphone MIC to the audio codec in the data processor 120.

A key input unit 127 includes character/numeric keys for entering character/numeric information, and function keys for setting a variety of functions.

A camera unit 140 includes a camera sensor for capturing image data and converting the captured optical image signals into electrical image signals, and a signal processor for converting the analog image signals captured by the camera sensor into digital image data. The camera sensor is assumed to be a Charge-Coupled Device (CCD) or Complementary Metal-Oxide Semiconductor (CMOS) sensor, and the signal processor can be implemented with a Digital Signal Processor (DSP). The camera sensor and the signal processor can be implemented either integrally or separately. While its associated reserved area among multiple reserved areas of a memory 130 is being used as a general purpose, the camera unit 140 for performing a preview function for image capturing or video recording can be quickly driven or enabled to perform the preview function for image capturing or video recording.

An image processor 150 performs Image Signal Processing (ISP) to display the image signals output from the camera unit 140, on a display 160. The ISP can include gamma correction, interpolation, spatial variation, image effects, image scaling, Auto White Balance (AWB), Auto Exposure (AE), Auto Focus (AF) and the like. The image processor 150 processes image signals output from the camera unit 140 on a frame basis, and outputs frame image data according to the characteristics and size of the display 160. The image processor 150, which includes a video codec 151, compresses frame image data displayed on the display 160 and decompresses the compressed frame image data into its original frame image data, using a predetermined coding/decoding scheme. The video codec 151 can be a Joint Photographic Experts Group (JPEG) codec, a Moving Picture Experts Group 4 (MPEG4) codec, a Wavelet codec and the like. The image processor 150 is assumed to have an On Screen Display (OSD) function. Under control of a processor 110, the image processor 150 can output OSD data depending on the size of the displayed screen.

If video recording or video playback is performed by means of the video codec 151, the camera unit 140 for performing video recording or video playback can be quickly driven to perform video recording or video playback while its associated reserved area among multiple reserved areas of the memory 130 is being used as a general purpose.

The display 160 displays on its screen the image signals output from the image processor 150 and the user data output from the processor 110. A Liquid Crystal Display (LCD) can be used for the display 160. In this case, the display 160 can include an LCD controller, a video memory capable of storing image data, and an LCD panel. When implemented as a touch screen, the LCD can operate as an input unit. In this case, the same keys as those on the key input unit 127 can be displayed on the display 160.

The processor 110 controls the overall operation of the terminal. When a specific function is selected by a user, the processor 110 activates a specific part to perform the specific function. The specific part is assigned with an area of the memory 130 by the Operating System (OS) to perform the specific function, and the assigned area of the memory 130 can belong to one of multiple reserved areas and multiple non-reserved areas of the memory 130.

In the case where there is a reserved area for a video codec device among the multiple reserved areas of the memory 130, if the processor 110 drives the video codec 151 to perform video recording or video playback when performing video recording or video playback, the video codec 151 can perform video recording or video playback using its reserved area among the multiple reserved areas of the memory 130.

Also, in the case where there is a reserved area for a camera functional unit among the multiple reserved areas of the memory 130, if the processor 110 controls the camera unit 140 to be driven to perform a preview function for image capturing or video recording when performing the preview function for image capturing or video recording, the camera unit 140 can perform the preview function for image capturing or video recording using its reserved area among the multiple reserved areas of the memory 130 by means of the OS.

The memory 130 can be divided into a program memory and a data memory. The program memory can store control programs for controlling the general operation of the terminal. The data memory can temporarily store the data generated during execution of the control programs.

The memory 130 can physically include multiple reserved area and multiple non-reserved areas. A data withdrawal condition is set for each of the multiple reserved areas of the memory 130 so that the multiple reserved areas can be used as non-reserved areas when functional units corresponding to the multiple reserved areas are not driven.

Figure 3:
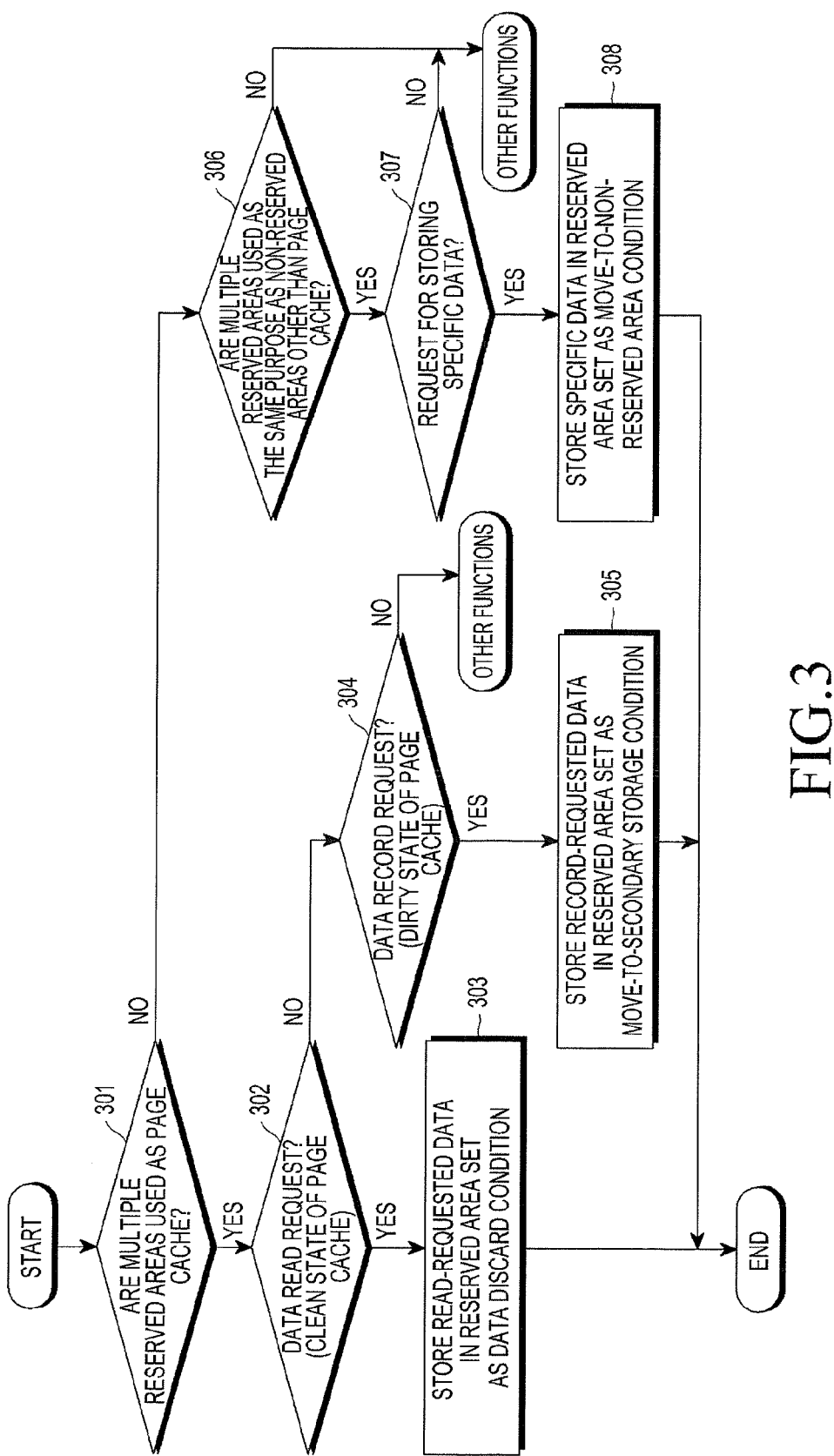
FIG. 3 is a flowchart illustrating a process of storing data in a reserved area of a memory depending on a data withdrawal condition according to a first embodiment of the present disclosure.

FIG. 3 is a flowchart illustrating a process of storing data in a reserved area of a memory based on a data withdrawal condition according to a first exemplary embodiment of the present disclosure. Referring to FIG. 3, as for a memory including multiple reserved areas and multiple non-reserved areas, if a device assigned with one of the multiple reserved areas is not driven, the OS can use the unoccupied reserved areas as a general purpose, like the multiple non-reserved areas. The reserved areas are physically contiguous areas which are allocated in advance for functional units. The non-reserved areas represent the areas which are dynamically allocated by the OS.

The phrase 'used as a general purpose' as used herein can mean that a reserved area can be used as a space to store the data structure of the OS, such as code, stack, heap and page cache of the process, and the contents constituting the virtual address space of processes running in the OS.

In one embodiment of the present disclosure, a data withdrawal condition set is configured for each of the multiple reserved areas. The data withdrawal conditions are set for each of the multiple reserved areas assigned to functional units in increasing order of an initial driving speed to quickly withdraw data from the multiple reserved areas which have been used as non-reserved areas when the devices assigned to the multiple reserved areas are driven.

The data withdrawal condition set includes a data discard condition for deleting data, a move-to-non-reserved area condition for moving data to non-reserved areas, and a move-to-secondary storage condition for moving data to a secondary storage, which provide a different initial driving speeds to a functional unit.

The data discard condition has the highest data processing speed since it immediately deletes the data stored in a reserved area. The move-to-non-reserved area condition has the second highest data processing speed since it moves the data within the memory. The move-to-secondary storage condition has the lowest data processing speed since it moves the data from the memory to the secondary storage.

Therefore, an appropriate data processing condition can be set for an associated reserved memory area based on an initial driving speed that a functional unit requires.

Generally the camera function should be driven quickly, in other words, it needs to have a high initial driving speed). On the other hand, a video playback function can tolerate a slight delay in its initial driving speed. Even for a video recording function, there is a spare time to some extent until an explicit recording (encoding) start command is issued after a preview image is displayed. Therefore, for the reserved memory area used by a hardware video codec unit, a slight delay in its page migration or data processing is allowable.

In this case, therefore, as to the data withdrawal condition set, a data discard condition for deleting data at the highest data processing speed can be set for a reserved area for a camera unit, and a move-to-non-reserved area condition for moving data to non-reserved areas or a move-to-secondary storage condition for moving data to a secondary storage can be set for a reserved area for a hardware video codec unit.

In this way, data processing conditions are configured for each of the multiple reserved areas. The OS of the terminal determines in step 301 whether the multiple reserved areas are used for the purpose of a page cache where a memory is used like a cache. If so, the OS determines in step 302 whether there is a request for reading data stored in a secondary storage. Upon the request for reading data stored in a secondary storage, the OS stores the read data in a reserved area for which a data discard condition is set among the multiple reserved areas in step 303.

If the data stored in the secondary storage is read out and stored in the reserved area of the memory, the page cache transitions to a clean state. The term 'clean state' as used herein can refer to a state in which as the data read from a secondary storage is not updated after it is cached in a memory, there is no need to reflect the data cached in the memory back in the secondary storage, meaning that the same data exists in the secondary storage and the memory. Therefore, as the data in the secondary storage is read out and stored in the reserved area of the memory, the data stored in the reserved area of the memory and read out from the secondary storage is allowed to be deleted.

Therefore, upon request for reading data stored in the secondary storage, the OS stores the read-requested data in a reserved memory area for which the data discard condition for deleting data is set.

If there is a request for recording data in the secondary storage in step 304 while the multiple reserved areas A are used for the purpose of a page cache in step 301, the OS stores the read data in a reserved area, for which the move-to-secondary storage condition is set, among the multiple reserved areas, in step 305.

If the data to be recorded in the secondary storage is stored in the reserved area of the memory, the page cache transitions to a dirty state. The term 'dirty state' as used herein can refer to a state in which as the data read from a secondary storage is updated after it is cached in a memory, the updated data needs to be reflected in the secondary storage. In other words, different data exists in the secondary storage and the memory. Therefore, as the data is stored only in the memory and is not stored in the secondary storage, the data stored in the reserved area of the memory needs to be moved to the secondary storage.

Therefore, upon request for recording data stored in the secondary storage, the OS stores the record-requested data in a reserved memory area for which the move-to-secondary storage condition for moving data to a secondary storage is set.

If the data in the memory is modified in the page cache's clean state where the same data exists in the secondary storage and the memory, the page cache transitions to the dirty state. On the contrary, if the data stored in the memory is moved to the secondary storage in the page cache's dirty state where different data exists in the secondary storage and the memory, the page cache transitions to the clean state.

As such, the page cache's clean state can be switched to the page cache's dirty state, and the page cache's dirty state can be switched to the page cache's clean state.

Therefore, the data stored in the reserved memory area which is switched from the page cache's clean state to the page cache's dirty state, can be moved to the reserved area for which the move-to-secondary storage condition is set, regardless of whether the functional unit is driven or not.

In addition, the data stored in the reserved memory area which is switched from the page cache's dirty state to the page cache's clean state, can be moved to the reserved area for which the data discard condition is set, regardless of whether the functional unit is driven or not.

Upon request for storing specific data in step 307 while the multiple reserved areas A of the memory have been used as the same purpose as non-reserved areas other than the page cache in step 306, the OS stores the specific data in a reserved area for which the move-to-non-reserved area condition is set, among the multiple reserved areas, in step 308.

Figure 4:
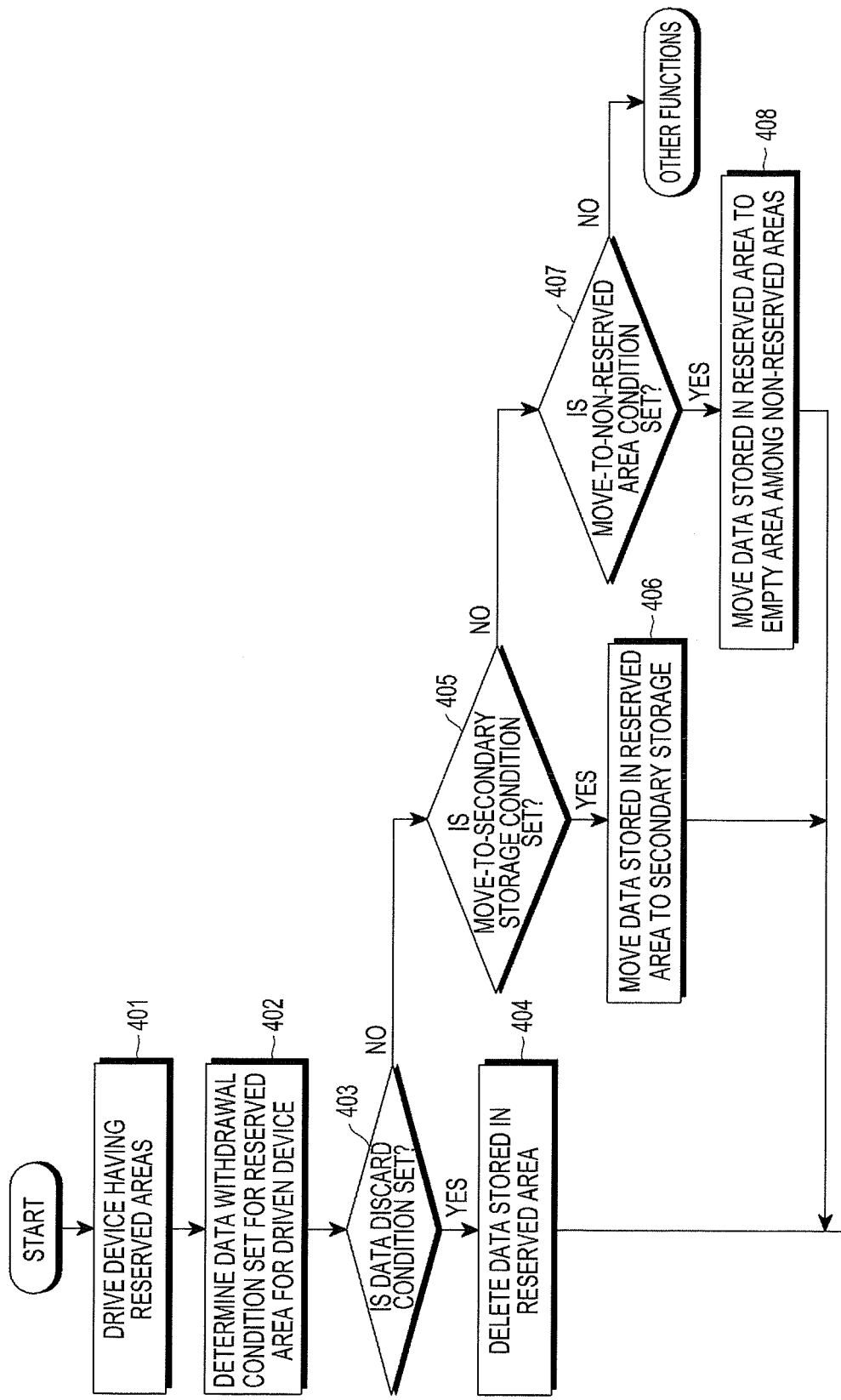
FIG. 4 is a flowchart illustrating a process of processing data in reserved areas of a memory depending on a data withdrawal condition according to the first embodiment of the present disclosure.

Reference will be made to FIG. 4 to describe a process of quickly processing the data stored in the multiple reserved areas, when data is stored in the multiple reserved areas A through the process of FIG. 3 and functional units assigned with the multiple reserved areas are driven.

FIG. 4 is a flowchart illustrating a process of processing data in reserved areas of a memory depending on a data withdrawal condition according to the first exemplary embodiment of the present disclosure.

Referring to FIG. 4, if a functional unit assigned with a specific reserved area among the multiple reserved areas is driven in step 401, the OS determines whether there is data in the specific reserved area. If there is data in the specific reserved area, the OS determines a data withdrawal condition which is set for the reserved area for the driven functional unit in step 402.

The OS determines in step 403 whether the set data withdrawal condition is a data discard condition. If the set data withdrawal condition is a data discard condition, the OS immediately delete the data stored in the specific reserved area to restore the specific reserved area in step 404, thereby using the specific reserved area as its original reserved area for driving the functional unit.

The OS determines in step 405 whether the set data withdrawal condition is a move-to-secondary storage condition. If the set data withdrawal condition is a move-to-secondary storage condition, the OS moves the data stored in the specific reserved area to the secondary storage to restore the specific reserved area in step 406, thereby using the specific reserved area as its original reserved area for driving the functional unit. In this case, the OS modifies a page table to indicate that the data is stored in the secondary storage instead of the specific reserved area.

The OS determines in step 407 whether the set data withdrawal condition is a move-to-non-reserved area condition. If the set data withdrawal condition is a move-to-non-reserved area condition, the OS moves the data stored in the specific reserved area to an empty area among the non-reserved areas of the memory to restore the specific reserved area in step 408, thereby using the specific reserved area as its original reserved area for driving the functional unit. In this case, the OS modifies the page table to indicate that the data is stored in the empty area among the non-reserved areas instead of the specific reserved area.

Figure 5A:
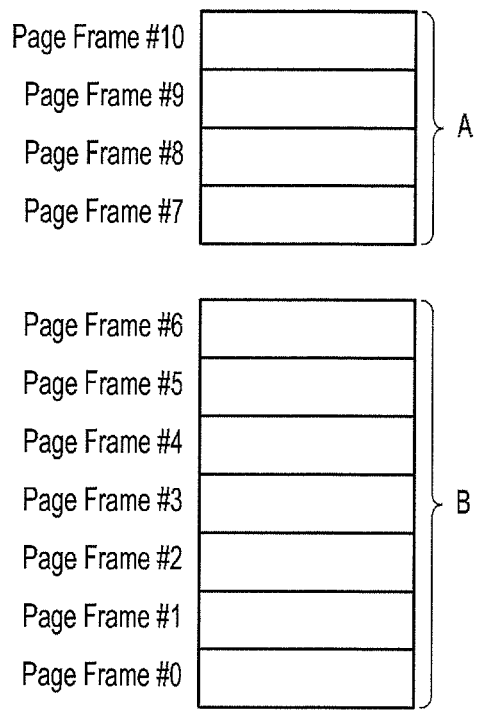
FIGS. 5A and 5B illustrate an operation of quickly processing data in reserved areas in a memory according to one embodiment of the present disclosure.
Figure 5B:
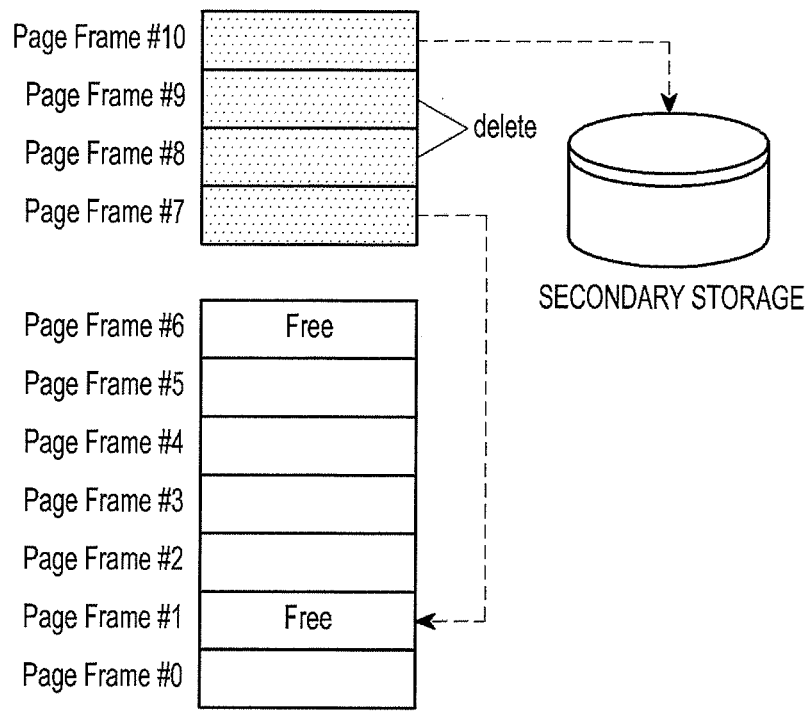

FIGS. 5A and 5B illustrate an operation of quickly processing data in reserved areas in a memory according to embodiments of the present disclosure.

Reference will be made to FIGS. 5A and 5B to describe the process of FIGS. 3 and 4. It will be assumed that a move-to-secondary storage condition is set for a page frame #10 among the multiple reserved areas A in the memory illustrated in FIG. 5A, a data discard condition is set for page frames #8 and #9, and a move-to-non-reserved area condition is set for a page frame #7.

If there is a request for reading data in step 302, the data read from the secondary storage is stored in the page frames #8 and #9, which are reserved areas with the data discard condition.

If there is a request for recording data in step 304, the data to be recorded in the secondary storage is stored in the page frame #10, which is a reserved area with the move-to-secondary storage condition.

If there is a request for storing specific data in step 307, the specific data is stored in the page frame #7, which is a reserved area with the move-to-non-reserved area condition.

As illustrated in FIG. 5B, if a functional unit assigned with the page frame #10, one of the multiple reserved areas A, is driven, the data stored in the page frame #10 is moved to the secondary storage, so the page frame #10 or the reserved area is withdrawn and used as an area for the driven functional unit.

If a functional unit assigned with the page frame #8 or #9, one of the multiple reserved areas A, is driven, the data stored in the page frame #8 or #9 is immediately deleted, so the page frame #8 or #9, which is the reserved area, is restored and used as an area for the driven functional unit.

As described above, as the data withdrawal condition is set for each of reserved areas which can be used as non-reserved areas, a functional unit requiring a high initial driving speed can quickly withdraw its associated reserved area and use it as its original purpose.

Figure 6:
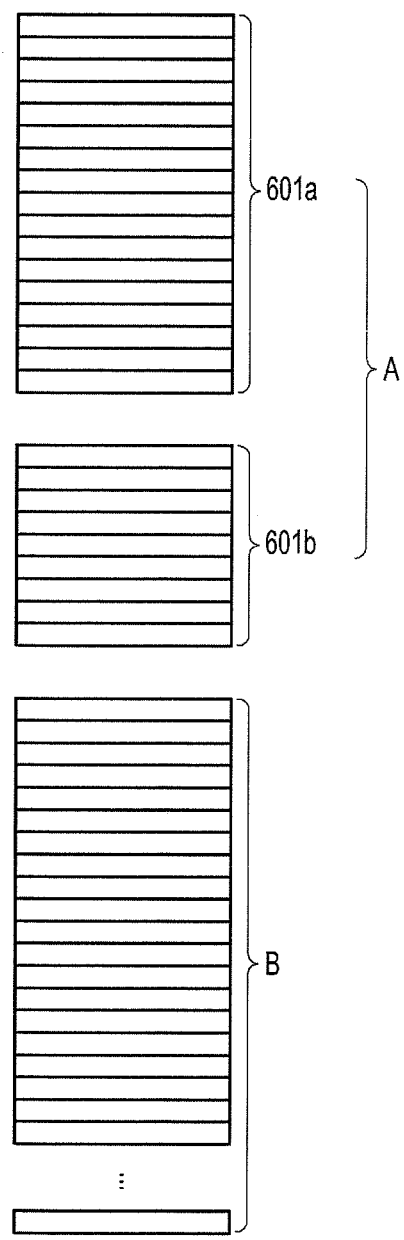
FIG. 6 illustrates an operation of quickly processing data in reserved areas regardless of storage space of reserved areas in a memory according to one embodiment of the present disclosure.

FIG. 6 illustrates an operation of fast processing data in reserved areas regardless of storage space of reserved areas in a memory according to one embodiment of the present disclosure.

Specifically, FIG. 6 illustrates a physical memory including multiple reserved areas A and multiple non-reserved areas B.

The multiple reserved areas A include reserved areas 601a which are used for a hardware video codec operation when performing an operation such as video recording or playback, and reserved areas 601b which are used for a camera operation for a preview function during image capturing or video recording. Therefore, the reserved areas 601a for a video codec functional unit have a larger storage space than the reserved areas 601b for a camera unit.

Generally, however, the camera function requires fast driving, whereas for the video playback function, a slight delay in its initial driving time is allowable.

Therefore, even though the data discard condition having the highest data processing speed is set for the reserved areas 601b having a smaller storage space as a data withdrawal condition, and the move-to-secondary storage condition or the move-to-non-reserved area condition is set for the reserved areas 601a having a larger storage space as a data withdrawal condition, there can be no problem in performing data processing or page migration on the data stored in the reserved areas 601a.

In other words, the reserved areas of the memory can be utilized taking into account the driving characteristics of the functional unit assigned with the reserved areas of the memory, and how easy the page migration can be performed.

Figure 7:
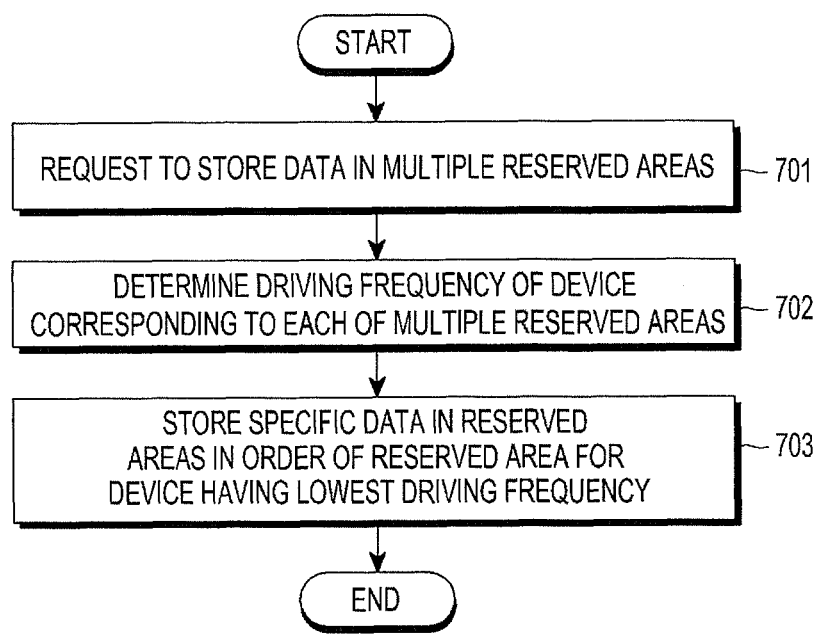
FIG. 7 is a flowchart illustrating a process of storing data in reserved areas in decreasing order of driving frequencies of the corresponding functional units according to a second exemplary embodiment of the present disclosure.

FIG. 7 is a flowchart illustrating a process of storing data in reserved areas in decreasing order of driving frequencies of the corresponding functional units area according to a second exemplary embodiment of the present disclosure.

Referring to FIG. 7, for a memory including multiple reserved areas and multiple non-reserved areas, when functional units associated with the multiple reserved areas are not driven, the OS can use the multiple reserved areas as a general purpose like the multiple non-reserved areas.

The reserved areas represent physically contiguous areas which are allocated in advance for a functional unit, and the non-reserved areas represent which are dynamically allocated by the OS.

The phrase 'used as a general purpose' as used herein can mean that a reserved area can be used as a space to store the data structure of the OS, such as code, stack, heap and page cache of the process, and the contents constituting the virtual address space of processes running in the OS.

In one embodiment of the present disclosure, when reserved areas are used as the same purpose as non-reserved areas, data can be stored in the reserved areas based on the driving frequency of the functional unit.

In other words, functional units assigned with reserved areas can be divided into a functional unit that is frequently driven, and a functional unit that is seldom driven. For example, in the case of a user who uses video playback more frequently than image capturing, the reserved areas for the less-frequently used camera unit can be used first. However, in the case of a user having the opposite usage pattern, the reserved areas can have the opposite priorities.

Therefore, when reserved areas are used as the same purpose as non-reserved areas, data is first stored in less-frequently used areas among the reserved areas, i.e., in the reserved areas associated with a functional unit having the lowest driving frequency.

The terminal can have a separate monitoring application to check or count the driving frequency for each of the functional units assigned with the reserved areas.

If there is a request for storing data in multiple reserved areas of the memory in step 701 while checking the driving frequency of functional units assigned with the multiple reserved areas of the memory by means of the monitoring application, the OS determines in step 702 the driving frequency for each of the functional units corresponding to the multiple reserved areas, the driving frequency being checked by the monitoring application.

In step 703, the OS stores the data in a reserved area for a functional unit having the lowest driving frequency or a first priority, among the functional units.

Thereafter, if there is a request for storing data in multiple reserved areas again, the OS repeats the process of storing the data in a reserved area for a functional unit having the lowest driving frequency or a second priority, among the functional units.

As described above, as data is stored in reserved areas in decreasing order of driving frequencies of the corresponding functional units when driving a functional unit having a high driving frequency, the OS can immediately use the reserved area in which no data is stored, thereby ensuring fast driving.

It is assumed that the data stored in reserved areas is processed depending on the data withdrawal condition in the examples of FIGS. 3 and 4, and the data stored in reserved areas is processed depending on the driving frequency of a functional unit in the example of FIG. 7. However, in utilizing reserved areas of the memory as the same purpose as non-reserved areas, the OS can first use the reserved areas requiring slow data processing compared to the reserved areas requiring fast data processing, due to the characteristics of the functional unit. For example, compared to the reserved areas assigned to the frequently-used camera unit, the reserved areas assigned to the less-frequently-used video codec unit for video playback can be used first.

Exemplary embodiments of the present can be implemented as computer-readable codes in computer-readable recording media. The computer-readable recording media can include all kinds of recording units storing computer-readable data. Examples of the recording media can include Read Only Memory (ROM), Random Access Memory (RAM), optical disk, magnetic tape, floppy disk, hard disk, non-volatile memory and the like, and can also include media implemented in the form of carrier waves (for example, transmission over the Internet). The computer-readable recording media can be distributed over the computer systems connected to the network, so computer-readable codes can be stored and executed in a distributed manner.

As is apparent from the foregoing description, the memory management method and apparatus proposed by the present disclosure can prevent the increase in the driving time of the device due to the time required for processing data stored in reserved areas of the memory, thereby ensuring fast response in the terminal.

Although the present disclosure has been described with one embodiment, various changes and modifications can be suggested to one skilled in the art. It is intended that the present disclosure encompass such changes and modifications as fall within the scope of the appended claims.

What is claimed is:

1. A method for managing a memory in an apparatus, comprising:
   dividing the memory into multiple reserved areas and multiple non-reserved areas to be assigned to respective functional units;
   if the functional unit assigned with one of the multiple reserved areas is not driven, storing data in the one of the multiple reserved area with one of a data withdrawal condition sets; and
   if the functional unit is driven, processing data stored in the one of the multiple reserved areas to restore the one of the multiple reserved areas for driving the functional unit, based on the one of data withdrawal condition sets,
   wherein the multiple reserved areas are assigned to at least one of a video codec unit configured to perform video recording or video playback or a camera unit configured to perform an image capturing or video recording.

2. The method of claim 1, wherein the memory includes the multiple reserved areas for which physically contiguous areas are allocated in advance for functional units, and the multiple non-reserved areas which are dynamically allocated.

3. The method of claim 1, further comprising setting data processing conditions for each of the multiple reserved areas.

4. The method of claim 1, wherein one of the data withdrawal condition set is configured for each of the multiple reserved areas assigned to the multiple functional units in increasing order of initial driving speeds that the functional units require in order to quickly restore the one of multiple reserved areas which has been used as the same purpose as non-reserved areas when the functional unit is driven.

5. The method of claim 1, wherein the data withdrawal condition set includes a data discard condition for deleting data, a move-to-non-reserved area condition for moving data to non-reserved areas, and a move-to-secondary storage condition for moving data to a secondary storage, each condition providing a different initial driving speed to a functional unit.

6. The method of claim 1, wherein the storing comprises:
   upon a request for reading data causing a page to switch to a clean state, while using the multiple reserved areas as page caches, storing data read from a secondary storage in a reserved area with a data discard condition out of the data withdrawal condition set, as the read-requested data;

upon a request for recording data causing a page to switch to a dirty state, while using the multiple reserved areas as page caches, storing data to be recorded in the secondary storage in a reserved area with a move-to-secondary storage condition out of the data withdrawal conditions set, as the record-requested data; and upon a request for storing specific data while using the multiple reserved areas as the same purpose as non-reserved areas other than the page cache, storing the specific data in a reserved area with a move-to-non-reserved area condition out of the data withdrawal conditions set.

7. The method of claim 1, wherein the withdrawing the multiple reserved areas comprises:
if the functional unit is driven, determining whether data is stored in a reserved area assigned to the functional unit; and
if data is stored in the reserved area corresponding to the functional unit, processing the stored data based on one of a data withdrawal condition set for the reserved area to restore the reserved area for driving the functional unit.

8. The method of claim 1, wherein the withdrawing the multiple reserved areas comprises:
if the functional unit is driven, determining whether data is stored in a reserved area assigned to the functional unit;
if data is stored in the reserved area assigned to the functional unit, identifying one of a data withdrawal condition set for the reserved area;
if a data discard condition out of the data withdrawal condition set is configured for the reserved area, deleting the data stored in the reserved area;
if a move-to-secondary storage condition out of the data withdrawal condition set is configured for the reserved area, moving the data stored in the reserved area to a secondary storage; and
if a move-to-non-reserved area condition out of the data withdrawal set is configured for the reserved, moving the data stored in the reserved area to an empty area among the non-reserved areas.

9. A method for managing a memory in an apparatus, comprising:
dividing the memory into multiple reserved areas and multiple non-reserved areas to be assigned to respective functional units;
if the functional unit assigned with the one of the multiple reserved areas is not driven, storing data in one of the multiple reserved areas in decreasing order of driving frequencies of corresponding functional units; and
if the functional unit is driven, processing data stored in each of the multiple reserved areas to restore the one of the multiple reserved areas for driving the functional unit,
wherein the multiple reserved areas are assigned to at least one of a video codec unit configured to perform video recording or video playback, or a camera unit configured to perform an image capturing or video recording.

10. The method of claim 9, wherein the memory includes the multiple reserved areas including physically contiguous areas that are allocated in series, and the multiple non-reserved areas that are dynamically allocated.

11. The method of claim 9, wherein the storing comprises:
upon a request for storing specific data while using the reserved areas as the same purpose as non-reserved areas, determining a driving frequency for each of the functional units; and
storing the data in reserved areas in decreasing order of driving frequencies of the corresponding functional units.

12. The method of claim 9, wherein the restoring the multiple reserved areas comprises:
if the functional unit among the functional units is driven, determining whether data is stored in the reserved area assigned to the functional unit; and
if data is stored in the reserved area assigned to the functional unit, processing the data stored in the reserved area depending on at least one of a data discard condition, a move-to-non-reserved area condition and a move-to-secondary storage condition, to withdraw the reserved area for driving the functional unit.

13. The method of claim 9, further comprising checking a driving frequency for each of the functional units assigned with the multiple reserved areas by means of a monitoring application.

14. A non-transitory processor-readable recoding medium recording a program that, when executed by a processor, causes the processor configured to:
divide the memory into multiple reserved areas and multiple non-reserved areas to be assigned to respective functional units;
if the functional unit assigned with one of the multiple reserved areas is not driven, store data in the one of the multiple reserved area with one of a data withdrawal condition sets; and
if the functional unit is driven, process data stored in the one of the multiple reserved areas to restore the one of the multiple reserved areas for driving the functional unit, based on the one of data withdrawal condition,
wherein the multiple reserved areas are assigned to at least one of a video codec unit configured to be driven for video recording or video playback, or a camera unit configured to be driven to perform an image capturing or video recording.

15. An apparatus comprising:
a video codec unit configured to be driven for video recording or video playback, with a reserved area in a memory for the video codec;
a camera unit configured to be driven to perform an image capturing or video recording, with a reserved area in a memory for the camera unit; and
the memory including multiple reserved areas and multiple non-reserved areas, wherein if a functional unit assigned with one of the multiple reserved areas is not driven, data is stored in the one of the multiple reserved areas with one of a data withdrawal condition sets, and when the functional units is driven, data stored in the one of the multiple reserved areas is processed to restore the one of the multiple reserved areas for driving the functional unit, based on the one of the data withdrawal condition sets.

16. The apparatus of claim 15, wherein the reserved areas include physically contiguous areas that are allocated in advance for functional units, and the non-reserved areas that are dynamically allocated.

17. The apparatus of claim 15, wherein the data withdrawal condition set is configured for each of the multiple reserved areas corresponding to the functional units in increasing order of initial driving speeds that functional units require, in order to quickly restore the multiple reserved areas which have been used as the same purpose as non-reserved areas when the functional unit is driven.

18. The apparatus of claim 15, wherein the data withdrawal condition set includes a data discard condition for deleting data, a move-to-non-reserved area condition for moving data to non-reserved areas, and a move-to-secondary storage condition for moving data to a secondary storage, each condition provide a different initial driving speed to a functional unit.

19. The apparatus of claim 15, wherein in the memory, when the functional unit assigned with the one of the multiple reserved areas is not driven, data causing a page to switch to a clean state is stored in a reserved area with a data discard condition of the data withdrawal condition set if the one of the multiple reserved areas is used as a page cache;
   wherein data causing a page to switch to a dirty state is stored in a reserved area with a move-to-secondary storage condition of the data withdrawal conditions set, if the one of the multiple reserved areas is used as a page cache; and
   wherein the data is stored in a reserved area with a move-to-non-reserved condition of the data withdrawal conditions set, if the one of the multiple reserved areas is used as the same purpose as non-reserved reserves other than the page cache.

20. The apparatus of claim 15, wherein in the memory, if the functional unit is driven, data stored in a reserved area assigned to the functional unit is processed to restore the reserved area for driving the functional unit based on the one of the data withdrawal condition set for the reserved area.

21. The apparatus of claim 15, wherein when a functional unit among the functional units is driven, data stored in a reserved area assigned to the functional unit is deleted if the one of the data withdrawal condition set for the reserved area is a data discard condition;
   wherein data stored in the reserved area assigned to the functional unit is moved to a secondary storage, if the one of the data withdrawal condition set for the reserved area is a move-to-secondary storage condition; and
   wherein data stored in the reserved area assigned to the functional unit is moved to an empty area among the non-reserved areas, if the one of the withdrawal condition set for the reserved area is a move-to-non-reserved area condition.

22. The apparatus of claim 15, wherein in the memory, for a reserved area for the video codec, if the video codec unit is not driven, data with the one of the data withdrawal condition set for the reserved area is stored in the reserved area for the video codec unit; and
   wherein if the video codec unit is driven, the data stored in the reserved area for the video codec unit is processed based on the one of the data withdrawal condition set for the reserved area for the video codec unit, and then the reserved area is restored as a reserved area for driving the video codec unit.

23. The apparatus of claim 15, wherein in the memory, for a reserved area for the camera unit, if the camera unit is not driven, data with one of the data withdrawal condition which is set for the reserved area for the camera unit is stored in the reserved area for the camera unit; and
   wherein if the camera unit is driven, the data stored in the reserved area for the camera unit is processed depending on the data withdrawal condition which is set for the reserved area for the camera unit, and then the reserved area is withdrawn as a reserved area for driving the camera unit.

24. An apparatus comprising:
   a video codec unit configured to be driven for video recording or video playback, and for which a memory has a reserved area for the video codec;
   a camera unit configured to be driven to perform image capturing or video recording, with a reserved area in the memory for the camera unit; and
   the memory including multiple reserved areas and multiple non-reserved areas, wherein if a functional unit assigned with the one of the multiple reserved areas is not driven, data is stored in the one of the multiple reserved areas in decreasing order of driving frequencies of corresponding functional units; and if the functional unit is driven, data stored in each of the multiple reserved areas is processed to restore the one of the multiple reserved area for driving the functional units.

25. The apparatus of claim 24, wherein the reserved areas include physically contiguous areas that are allocated in advance for functional units, and the non-reserved areas that are dynamically allocated.

26. The apparatus of claim 24, wherein the data withdrawal condition set includes at least one of a data discard condition, a move-to-non-reserved area condition and a move-to-secondary storage condition.

27. The apparatus of claim 24, wherein driving frequencies for each of the functional units corresponding to the multiple reserved areas is checked by means of a monitoring application.

28. The apparatus of claim 24, wherein in the memory, when the video codec unit is higher in driving frequency than the camera unit, data is stored in a reserved area for the video codec unit if the video codec unit is not driven; and
   wherein the data stored in the reserved area for the video codec is processed to be restored as a reserved area for driving the video codec unit when the video codec is driven.

29. The apparatus of claim 24, wherein in the memory, when the camera unit is higher in driving frequency than the video codec unit, data is stored in a reserved area for the camera unit if the camera unit is not driven; and
   wherein the data stored in the reserved area for the camera unit is processed to be restored as a reserved area for driving the camera unit when the camera unit is driven.

* * * * *